United States Patent [19]

Inaba et al.

[11] Patent Number: 5,659,784
[45] Date of Patent: Aug. 19, 1997

[54] MULTI-PROCESSOR SYSTEM HAVING COMMUNICATION REGISTER MODULES USING TEST-AND-SET REQUEST OPERATION FOR SYNCHRONIZING COMMUNICATIONS

[75] Inventors: Masanobu Inaba; Noriyuki Ando, both of Yamanashi, Japan

[73] Assignee: NEC Corporation, Tokyo, Japan

[21] Appl. No.: 379,941

[22] Filed: Jan. 27, 1995

[30] Foreign Application Priority Data

Jan. 28, 1994 [JP] Japan .................................. 6-008065
Dec. 26, 1994 [JP] Japan .................................. 6-322633

[51] Int. Cl.[6] ............................................... G06F 13/00
[52] U.S. Cl. ........................ 395/726; 395/474; 395/475; 395/448
[58] Field of Search ........................ 395/800, 425, 395/250, 375, 456, 497.04, 448, 181, 474, 475; 364/900; 340/825.8, 146.2

[56] References Cited

U.S. PATENT DOCUMENTS

| | | | |
|---|---|---|---|
| 4,412,303 | 10/1983 | Barnes et al. .......................... | 364/900 |
| 4,952,930 | 8/1990 | Franaszek et al. .................... | 340/825.8 |
| 4,980,819 | 12/1990 | Cushing et al. ...................... | 395/375 |
| 5,165,038 | 11/1992 | Beard et al. .......................... | 395/800 |
| 5,224,215 | 6/1993 | Disbrow ................................. | 395/250 |
| 5,249,283 | 9/1993 | Boland .................................. | 395/425 |
| 5,265,235 | 11/1993 | Sindhu et al. ........................ | 395/425 |
| 5,522,029 | 5/1996 | Hatfield ................................ | 395/181 |
| 5,535,361 | 7/1996 | Hirata et al. .......................... | 395/472 |

OTHER PUBLICATIONS

Lenoski et al, "Design of the Stanford DASH Multiprocessor", Dec. 1989, pp. 1–21.
Turner et al, "Scalability of the Cedar System", 1994, pp. 247–254.

Primary Examiner—Thomas C. Lee
Assistant Examiner—Le Hien Luu
Attorney, Agent, or Firm—Whitham, Curtis, Whitham & McGinn

[57] ABSTRACT

A multi-processor system includes N processors ("N" being an integer) for processing data, a storage unit for storing data, and a communication register unit for synchronizing a communication performed among the processors. These units are interconnected via an interconnection network. The communication register unit is subdivided into N communication register modules for storing the same contents. Each of the communication register modules is accessed by the respective processors in one-to-one correspondence, which can be referred at the same time. When a write request is made in a certain communication register module, the content of this write request is broadcasted to other communication register modules.

10 Claims, 10 Drawing Sheets

|   | 1 | 2 | 3 | 4 | 5 |
|---|---|---|---|---|---|
| COMMUNICATION REGISTER MODULE #1 | DECREMENT | | | | CHECK |
| COMMUNICATION REGISTER MODULE #2 | | DECREMENT | | | CHECK |
| COMMUNICATION REGISTER MODULE #3 | | | DECREMENT | | CHECK |
| COMMUNICATION REGISTER MODULE #4 | | | | DECREMENT | CHECK |

FIG.5

```
          FDCR    S0,   CR#0      ; S0←CR#0,  CR#0←CR#0-1
          BL      S0,   loop1     ; branch loop1 if S0>0
          SCR     S1,   CR#1      ; CR#1←S1
          B       loopend         ; branch loopend loop1:    LCR     S2,   CR#1      ; S2←CR#1
          BNE     S2,   loop1     ; branch loop1 if S2≠0
loopend:
```

FIG.9

MULTI-PROCESSOR SYSTEM HAVING COMMUNICATION REGISTER MODULES USING TEST-AND-SET REQUEST OPERATION FOR SYNCHRONIZING COMMUNICATIONS

BACKGROUND OF THE INVENTION

1. Field of the Invention

The present invention generally relates to a synchronization communication mechanism, and more specifically to a synchronization communication control mechanism employed in a multi-processor system.

2. Description of the Related Art

In multiple multi-processor systems, there are some possibilities that high-speed shared registers called "communication registers" are used to hold shared variables for executing synchronization controls, mutual exclusion controls, or communication controls among processors. This communication register is required such that the accessing time thereof is shortened, as compared with a storage unit, and/or the throughput thereof is relatively high. Thus, the respective processors execute the communications through such a communication register, so that the data processing speeds can be increased. Since sufficient parallelism could not be substantially achieved in the multi-processor system in the synchronization control, the mutual exclusion, or the communication control, these controls may greatly affect the performance of the overall system as the parallelism is increased. As a consequence, the arrangement of the communication register would greatly affect the improvement of the performance of the multi-processor system.

A description will now be made of the barrier synchronization as one example of above-described synchronization control.

The barrier synchronization implies such a process operation that all of a plurality processors are waiting in a barrier synchronization routine until all of these processors execute this barrier synchronization routine. This barrier synchronization routine is represented in FIG. 9. It is assumed that the number of processors for executing the barrier synchronization is stored in the communication register for storing therein the word of #0 as an initial value, a non-zero value is stored in the communication register for storing the word of #1, and zero values are stored into scalar registers S0 and S1.

The below-mentioned commands should be interpreted:

FDCR S0, CR#0: after the value of the word #0 in the communication register is stored into the scalar register S0, the value of the word #0 in this communication register is decreased by 1.

BL S0, loop 1: when the value of the scalar register S0 exceeds the zero value, the process operation is branched to loop 1.

SCR S1, CR#1: the value of the scalar register S1 is stored into the word #1 of the communication register.

B looped: the process operation jumps to looped without any condition.

LCR, S2, CR#1: the value of the word #1 in the communication register is stored into the scalar register S2.

BNE S2, loop 1: if the value of the scalar register S0 is equal to any values other than a zero value, then the process operation is branched to loop 1.

When the respective processors enter into the barrier routine, the value of the word #0 in the communication register is first saved to the scalar register S0, and then is decremented. Since the number of the processors has been stored as the initial value into the word #0 of the communication register, when all of the processors enter into this barrier routine, the value of the word #0 in the communication register becomes zero. Finally, the processors other than the processor which has entered into this barrier routine jump to loop 1, and wait in this loop until the final processor enters into the routine. It can be judged as to whether the processor corresponds to the final processor by checking the value of the word #0 in the communication register, which has been read by the FDCR command. If the checked processor corresponds to the final processor, then the zero value is written into the word #1 in the communication register, which will then be announced to other processors.

In the above-described conventional multi-processor system, only one request among a plurality of communication register access requests issued from a plurality of processors is accessible to the communication register unit at the same time. This may cause large overhead in the synchronization, mutual exclusion, and communication controls using the communication registers.

In this case, after the processors except for the final processor have executed the FDCR command, the final processor repeatedly executes the LCR command within loop 1 until this final processor causes the value of the word #1 to be zero value. This repeat execution is referred to as "spin lock". Since the spin lock is performed by all of the processors which have entered into the routine, the access operations to the communication registers are concentrated, so that large access contention may occur. Because of this access contention, the FDCR command access which is executed by the processor that has entered into the barrier synchronization routine should be brought into the waiting condition. In the worst case, the waiting time may reach the time period defined by the quantity of processors which is under spin lock condition and waits for the barrier synchronization.

Referring now to a time chart shown in FIG. 10, when the above-described barrier synchronization is executed by four processors, each of these processors sequentially decrements the word #0, and thereafter each processor checks as to whether or not the operations of the other processors are completed. As a consequence, when the barrier synchronization is performed by these four processors, 8 cycles are required to accomplish the synchronization. In other words, (2×N) cycles are required for N processors. It should be noted that symbol "N" indicates an integer.

SUMMARY OF THE INVENTION

An object of the present invention has been made in an attempt to solve the above-described problems, and therefore realizes that the synchronization communication control via. the communication register in the multi-processor system can be effected at high speeds.

Another object of the present invention is to avoid contention occurring among the processors while referring to the communication registers.

A multi-processor system, according to one preferred embodiment of the present invention, comprises N processors ("N" being an integer), a storage unit, a communication register unit, and an interconnection network for interconnecting said processors, said storage unit, and said communication register unit.

The communication register unit includes N communication register modules each for storing data having the same number of words, each of said communication register modules is so controlled as to store the respective words having the same contents with each other, and also is referred by only one specific processor.

BRIEF DESCRIPTION OF THE DRAWING

Various modes of the multi-processor system according to the present invention will be readily appreciated with reference to the accompanying drawings, in which:

FIG. 5 is a time chart for explaining operations of the first embodiment and a second embodiment of the present invention;

FIG. 9 illustrates an example of the program used to realize the barrier synchronization.

DETAILED DESCRIPTION OF THE PREFERRED EMBODIMENTS

A multi-processor system according to a preferred embodiment of the present invention will now be described in detail with reference to the drawings.

Figure 1:
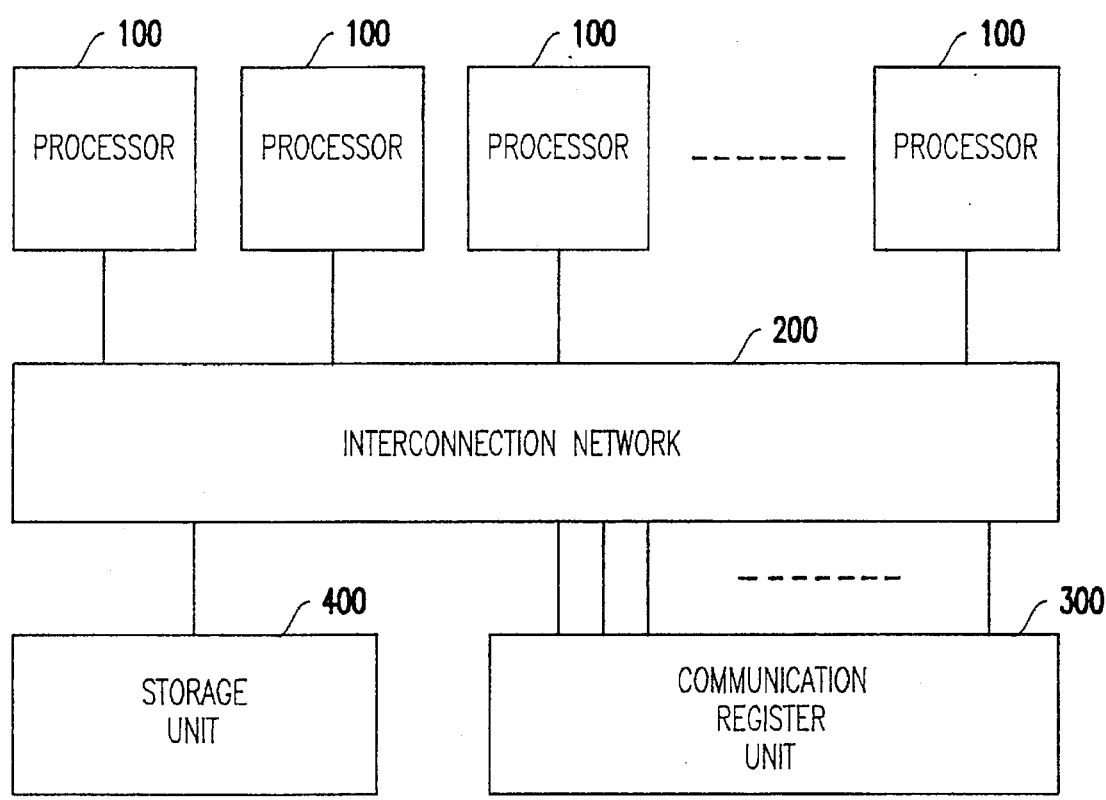
FIG. 1 schematically shows an overall arrangement of a multi-processor system according to the inventive concept of the present invention.

Referring now to FIG. 1, a multi-processor system according to an embodiment of the present-invention includes N processors 100 for processing data, a storage unit 400 for storing the data, and a communication register unit 300 for synchronizing communications among the processors. These units are interconnected with each other via an interconnection network 200.

Each of these processors 100 own a single access port with respect to the interconnection network 200. The storage unit 400 owns a single access port as the overall unit.

Figure 2:
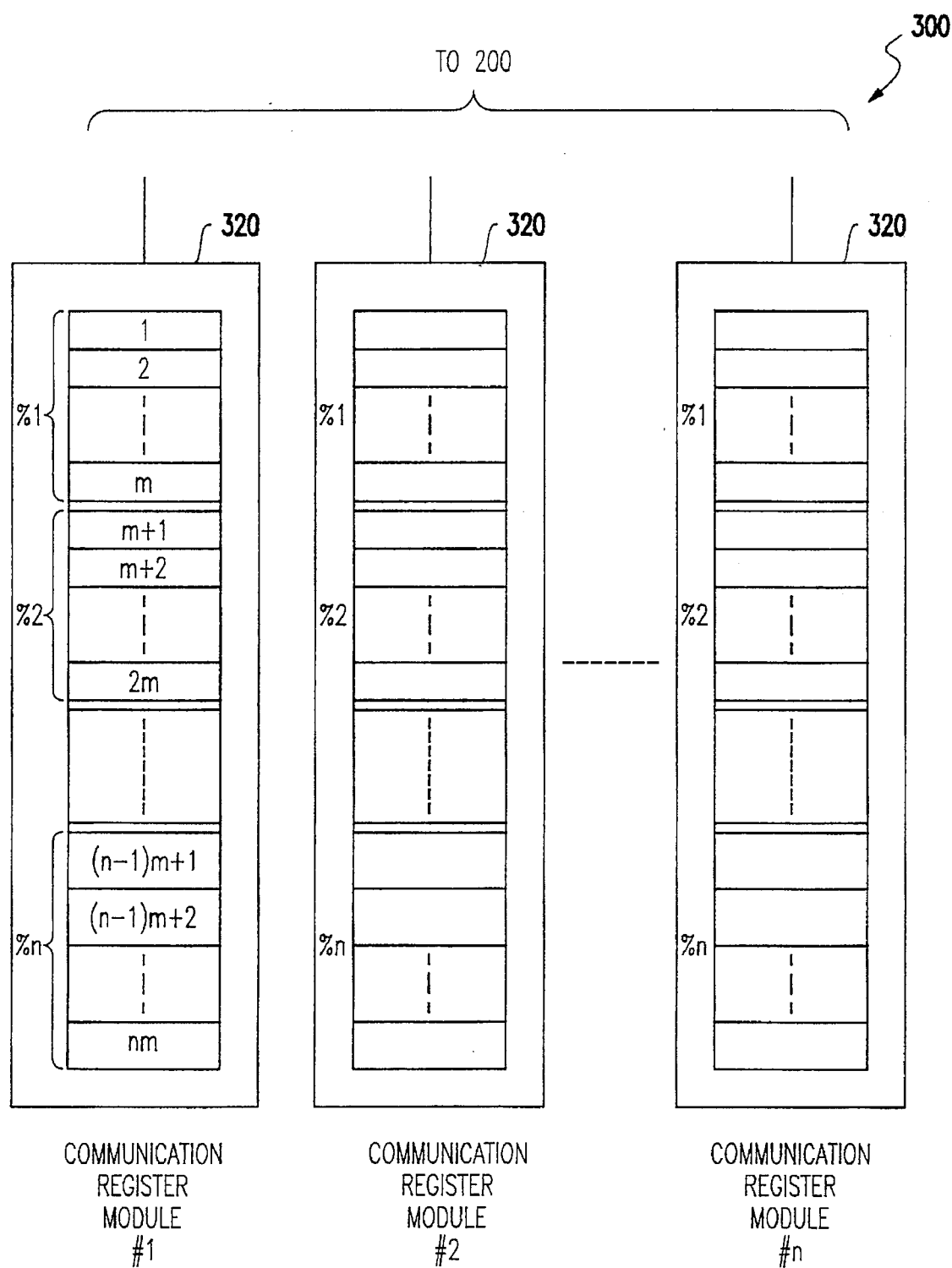
FIG. 2 schematically represents an arrangement of a communication register unit according to a first embodiment of the present invention.

Referring now to FIG. 2, the communication register unit 300 is subdivided into N communication register modules 320. An exclusively discriminable module number is attached to each of these communication register modules as an identifier. In this drawing, this module number is indicated by #1, #2, - - - , #N, respectively. Each of the communication register modules 320 owns a single access port with regard to the interconnection network.

Referring back to FIG. 1, the interconnection network 200 owns N ports in total with respect to the respective processors, N ports in total for the respective communication modules 320, and a single access port for the main storage unit. Access paths are provided among the access ports, and the access request is transported through the access paths. As an alternative arrangement, another multi-processor system is so arranged as to employ multiple access ports/access paths in order that the access throughput may be improved. For example, it may be arranged that N access paths are established between the main storage unit and the interconnection network.

When the processor 100 accesses either the storage unit 400 or the communication register unit 300, this processor 100 produces the request packet and sends it out via the access path to the interconnection network 200. The interconnection network 200 arbitrates the contention occurring in a plurality of request packets transferred from a plurality of processors 100, routes the respective request packets to their destinations, namely the storage unit 400 and the communication register unit 300, and sends out the request packets through the respective access paths thereto. The request packet arrived at either the storage unit 400, or the communication register unit 300 causes the read access or the write access in the respective units. In the case of the read access, the read data is again returned via the interconnection network to the processor.

Figure 4:
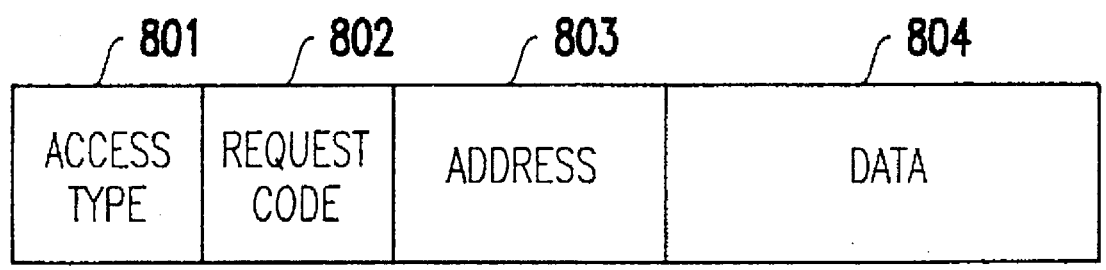
FIG. 4 indicates a format of a request passing through an interconnection network employed in the multi-processor system of the present invention.

Referring to FIG. 4, a format of a request packet transferred through the interconnection network 200 is constructed of an access type field 801 for indicating whether the storage unit 400 or the communication register unit 300 is accessed, a code field 802 for denoting whether the load access or a store access is made, an address field 803 for showing either the address of the storage unit 400 or the address of the communication register 300, and also a data field 804 for the write data. In the case of the load access, the read data is held in the data field and returned via the interconnection network 200 to the processor 100.

It should be noted that although this interconnection network 200 may be arranged by employing various network arrangements, such a network arrangement is desired that no blocking is produced when both of the request from the processor 100 to the communication register unit 300 and the request from another processor 100 to another communication register unit 300 simultaneously reach the access port of the interconnection network 200. For instance, the non-blocking type crossbar switch is one of the desirable arrangements.

Figure 3:
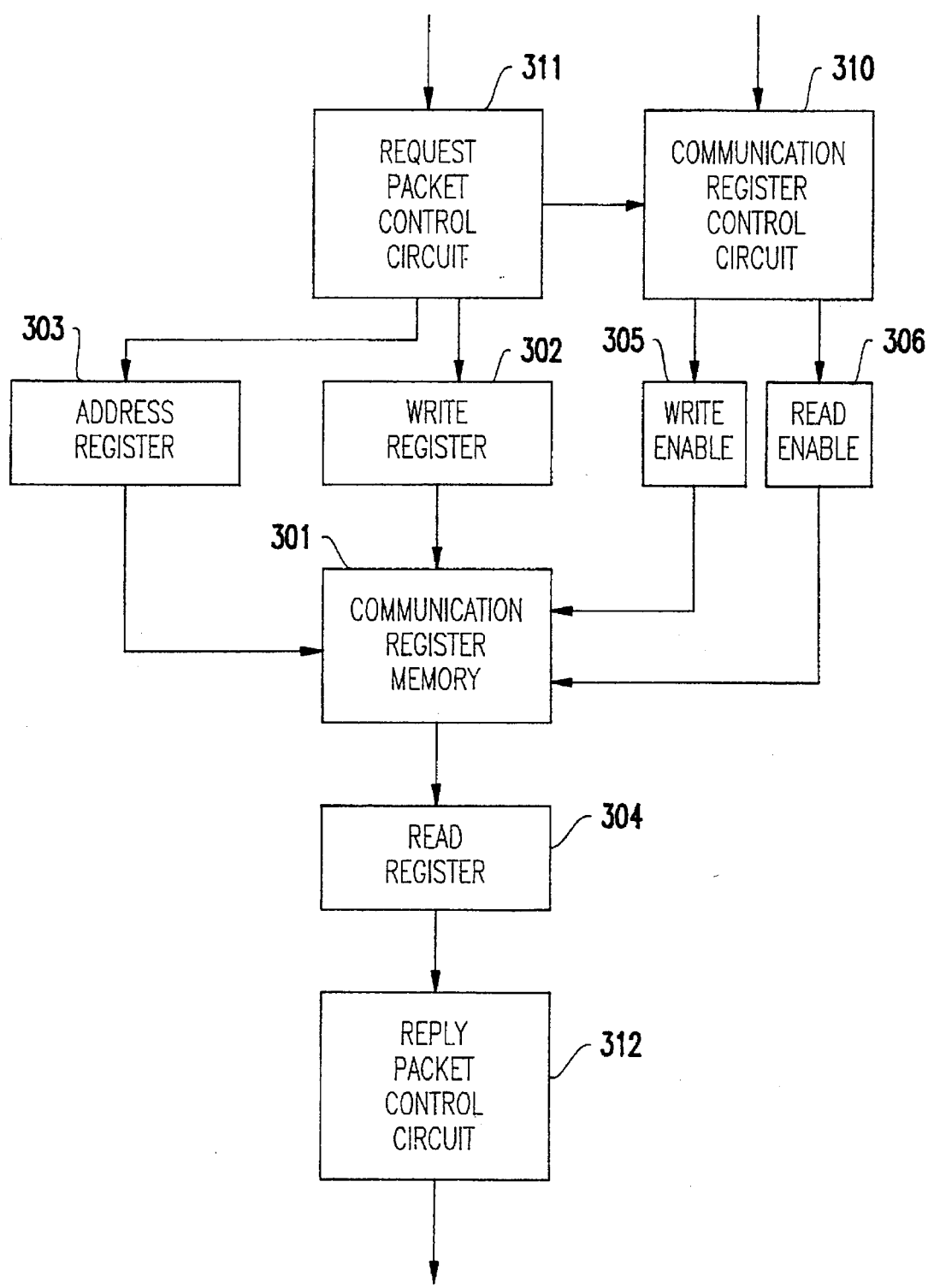
FIG. 3 is a schematic illustration for showing an arrangement of a communication register module employed in the communication register unit of FIG. 2.

As apparent from FIG. 3, each of the communication modules 320 within the communication register unit 300 includes a communication register memory 301 constructed of a plurality of words, a write register 302 for supplying the write data to the communication register memory 301, an address register 303 for supplying the address to the communication register memory 301, and a read register 304 for holding the data read out from communication register memory 301. This communication register module 320 further includes a write enable register 305 for enabling the communication register memory 301 to write the data, a read enable register 306 for enabling the communication register memory 301 to read the data, a request packet control circuit 311 for taking the request packet sent from the interconnection network 200 apart into a plurality of request packets which will then be distributed to the respective circuit units, a communication register control circuit 310 for controlling accessing operation to the communication register memory 301, and a reply packet control circuit 312 for producing a reply packet to the interconnection network 200.

The address numbers are allocated to the communication register memories 301 from the zero address in a serial form.

In the access to the communication register issued from the processor 100, this communication register is address-designated to determine the word position of the communication register to be accessed.

The contents of the data stored into the respective words of the communication register memory 301 may be arbitrarily determined. When the communication register is used for achieving synchronization, either all bits of the word, or some bits thereof may be used as a synchronizing flag. Alternatively, only the most significant bit (MSB) of the word may be used as the synchronizing flag, and the remaining bits thereof may be utilized as the storage data sent/received among the processors.

When the data is written into the communication register memory 301, the value of "1" is set to the write enable register 305, the address of the word to be written is set to the address register 303, and then the data to be written is set into the write register 302. At the next timing, the value of the write register 302 is written into the word of the communication register memory 301 designated by the address register 303.

When the data is read into the communication register memory 301, the value of 1 is set into the read enable register 306, and then the address of the word to be read is set into the address register 303. At the subsequent timing, the data is read out from the word of the communication register memory 301 designated by the address register 303, and thereafter held into the read register 304.

These registers provided around the communication register memory 301 are controlled by the communication register control circuit 310.

A request packet control circuit 311 controls the request packet arrived from the interconnection network 200. Upon receipt of the request packet from the interconnection network 200, the request packet control circuit 311 decodes a request code field 802, and also judges whether the load access or the store access is issued. The decoded result is sent to the communication register control circuit 310. A reply packet control circuit 312 causes the data held in the read register to be stored into a data field 804 of a packet, thereby constituting this data as a reply packet to the interconnection network 200.

Subsequently, a description will now be made of process operations carried out in the communication register module 320 during the access operation to the communication register.

In the case of the store access, the data within the data field 804 is written into the word addressed by the address field 803 in the communication register memory 301. That is, the address of the communication register is entered into the address register 303 at the write timing. Also, the write data within the data field 804 is entered into the write register 302. At the same time, the content of the write enable register 305 is set to the value of "1", so that the write access is completed at the next timing.

In the case of the load access, the data is read out from the word addressed by the address field 803 in the communication register memory 301. In other words, the communication register address in the address field 803 is entered into the address register 303, and at the same time, the content of the read enable register 306 is set to the value of "1" at the read timing. At the next timing, the read data is held in the read register 304. This data held by the read register 304 is stored into the data field 804 of the packet, and is constructed as the reply packet to the interconnection network. This reply packet is sent out to the interconnection network 200.

Referring back to FIG. 2, each of the communication register modules 320 employed in the communication register unit 300 is equally divided into N register module groups. Each of these equally divided register module groups will be referred to as a "set." A single set is arranged by "M" words. In other words, each of these communication register modules 320 contains N sets of "M" words-sets. It should be noted that set numbers discriminable from each other are attached to the sets. In FIG. 2, this set number is indicated by %1, %2, - - -, %N.

Also, it should be noted that the set number identical to the module number in the respective communication register modules 320 is called a "real set," and the communication register in this real set is referred to as a "real communication register." Other (N–1) sets are called as "copy sets," whereas the communication register within this set is referred to as "a copy of communication register". The sets to which the same set numbers have been attached are controlled so as to store the same contents. For instance, in the communication register module #1, the set of %1 corresponds to the real set, and other sets correspond to the copy sets.

When the data is written into a certain communication register module 320, the data having the same content as that of the first-mentioned data is written into the corresponding word within the other communication register modules in this cycle. In this embodiment, the interconnection network 200 controls this data writing operation. When the decrement process by the broadcast contends with the checking process in the respective communication register modules 320, the interconnection network 200 performs such a control operation that the decrement process by the broadcast is performed at a top priority.

Referring now to the time chart of FIG. 5, in accordance with this embodiment, when four sets of the processors execute the synchronization operation, the decrement is executed in the communication register module #1 at the first cycle, resulting that the writing operation by the broadcast is carried out in other communication register modules. At the second cycle, the decrement is executed in the communication register module #2, so that the writing operation by the broadcast is performed in other communication register modules. Subsequently, a similar process operation is carried out with respect to the communication register module #3 at the third cycle and the communication register module #4 at the fourth cycle. Then, the checking process is performed at the respective communication register modules at the fifth cycle. As a result, it is confirmed that all of that processors could be synchronized with each other. In other words, although the conventional multi-processor system requires the checking phases steps in proportion to the total number of the employed processors, the checking phase of the multi-processor system according to this embodiment could be completed within steps in proportion to one processor.

In the multi-processor system with the above-described arrangements according to this preferred embodiment, the communication register access is processed as follows: In the case of the read access, the read access operation is carried out for such a communication register module having the same module number as that of the processor which has issued the read access. At this time, each of communication registers is accessed unrelated to whether it is the real set or the copy set.

In the case of the write access request, after the write data is broadcasted by the interconnection network 200, the write data is written into the respective communication register modules 320 having the same addresses.

In the case of the test-and-set command, the test process is performed for such a communication register module that there is the real communication register corresponding to the address of the communication register which performs the test process. As a result of the test process, if it fails to lock, then the test result is returned to the processor. Conversely, if it succeeds to lock, then the writing operation of the lock bit is carried out for the real communication register. Also, the writing process of the lock bit is performed via the interconnection network 200 with respect to all of the communication register copies having the same addresses.

As previously described, in accordance with the first embodiment of the present invention, the communication register module 320 dedicated to each of the processors is employed. When the writing operation is requested, the writing request is broadcasted via the interconnection network 200, so that the checking operation can be performed by the respective processors 100 at the same time, and the time required to carry out this checking operation can be shortened.

Figure 6:
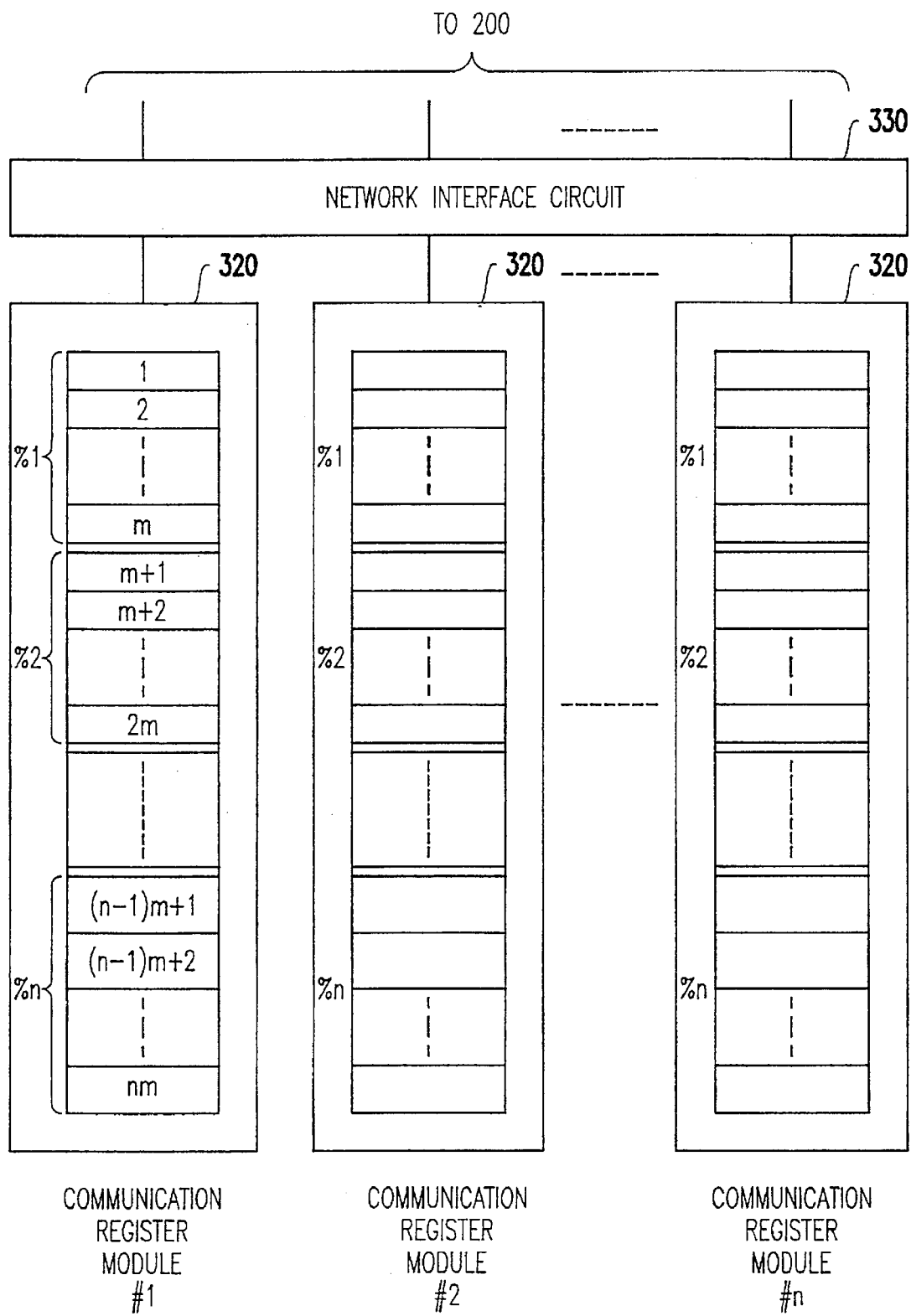
FIG. 6 schematically represents an arrangement of a communication register unit according to the second embodiment of the present invention.

Next, a description will now be made of a multi-processor system according to a second preferred embodiment of the present invention. The multi-processor system of this second embodiment has a similar arrangement to that of the first embodiment except for such a different internal arrangement of the communication register unit 300 as follows. That is, as represented in FIG. 6, the communication register unit 300 according to the second embodiment of the present invention includes N communication register modules 320, which is similar to those of the abovedescribed first embodiment. However, this communication register unit 300 includes a network interface circuit 330 between these communication register modules 320 and the interconnection network 200, which is different from that of the first embodiment.

The network interface circuit 330 has an interface mechanism between the interconnection network 200 and each of the communication register modules 320. During the read access operation, the network interface circuit 330 causes the request sent from the interconnection network 200 to pass through the same output port as the input port. During the write access operation, the network interface circuit 330 broadcasts the request to all the communication register modules 320. At this time, the request format is transmitted to the respective communication register modules 320 without any modification. During the test-and-set access operation, the network interface circuit 330 routes this request to such a communication register module that there exists the real communication register corresponding to the address of the communication register which executes the test. Furthermore, as a result of the test-and-set access operations, if it succeeds to lock, then the result is broadcasted to all of the communication register modules 320.

In response to the request derived from the network interface circuit 330, each of the communication register modules 320 accesses the word of the communication register indicated in the address field 803 to execute the process indicated in the request code field 802.

According to the second embodiment, when the decrement by the broadcasting operation and the checking process contend with each other in the respective communication register modules 320, the network interface circuit 330 performs the controls in such a manner that the broadcasting operation should be carried out prior to other accesses.

In the multi-processor system with the above-described arrangement, according to the second embodiment, the communication register access request is processed as follows: That is, in the case of the read access request, the read access operation is carried out for such a communication register module having the same module number as that of the processor which has issued the access request. At this time, each of the communication registers is accessed unrelated to whether it is the real set or the copy set.

In the case of the write access request, after the communication module having the same module number as that of the processor which has issued the write access is broadcasted by the network interface circuit 330, the data is written into the respective communication register modules 320 having the same addresses.

In the case of the test-and-set command, the test process is performed for such a communication register module that there is the real communication register corresponding to the address of the communication register which performs the test process. As a result of the test process, if it fails to lock, then the test result is returned to the processor. Conversely, if it succeeds to lock, then the writing operation of the lock bit is carried out for the real communication register. At the same time, the writing operation of the lock bit is performed via the network interface circuit 330 with respect to all the communication register copies having the same addresses.

As previously described, in accordance with the second embodiment of the present invention, the communication register module 320 dedicated to each of the processors is employed when the writing operation is requested, the writing request is broadcasted via the network interface circuit 330, so that the checking operation can be performed by the respective processors 100 at the same time, and the time required to carry out this checking operation can be shortened.

Next, a description will now be made of a multi-processor system according to a third preferred embodiment of the present invention. The multi-processor system of this third embodiment has a similar arrangement to that of other embodiments except for such a different internal arrangement of the communication register unit 300 as follows.

Figure 7:
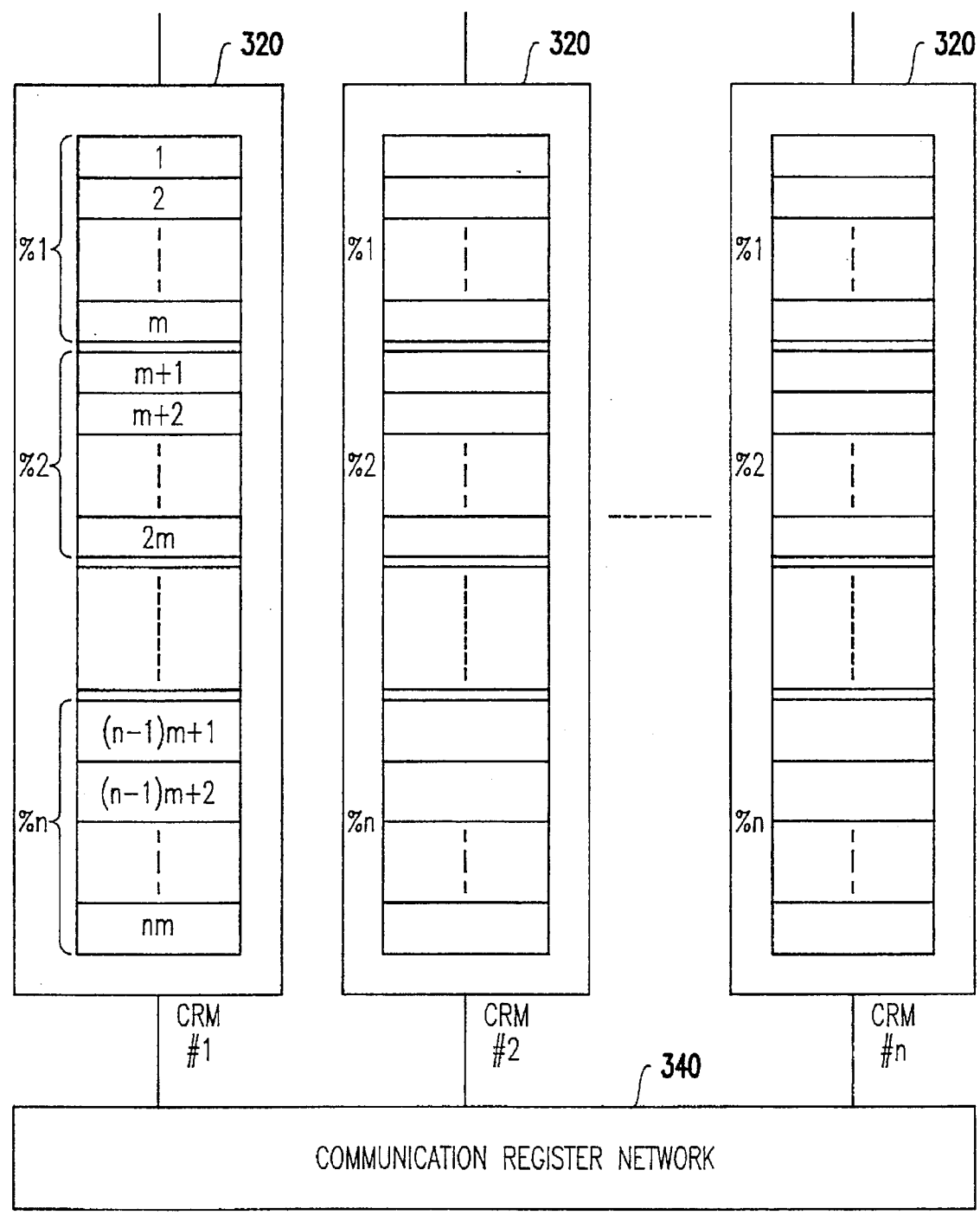
FIG. 7 schematically represents an arrangement of a communication register unit according to a third embodiment of the present invention.

That is, as represented in FIG. 7, the communication register unit 300 according to the third embodiment of the present invention includes N communication register modules 320, which is similar to those of the above-described first and second embodiments. However, this communication register unit 300 includes a communication register network 340 coupling the communication register modules 320 with each other, which is different from the other embodiments.

In this third embodiment, the respective communication register modules 320 have two ports capable of simultaneously accepting two accesses at maximum.

When the data is written into a certain communication module 320, the data having the same contents are written into the corresponding words in other communication register modules at this data writing cycle. In this embodiment, the communication register network 340 controls this data writing operation. In the respective communication register modules 320, when the decrement by the broadcasting operation contends with the checking process, the communication register network 340 performs the controls in such a manner that the broadcasting operation should be carried out prior to other accesses.

Figure 8:
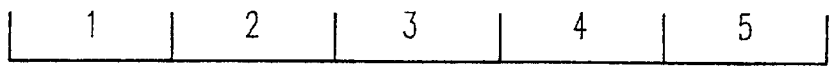
FIG. 8 is a time chart for explaining operations of a third embodiment of the present invention.
Figure 8:
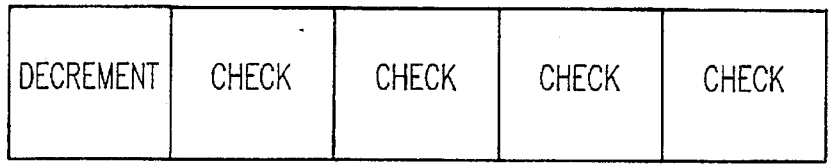
Figure 8:
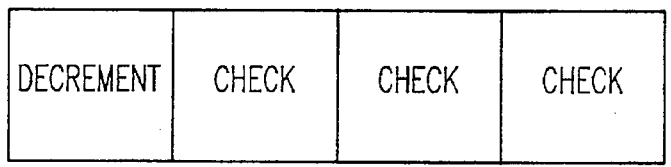
Figure 8:
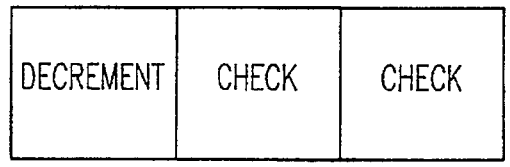
Figure 8:
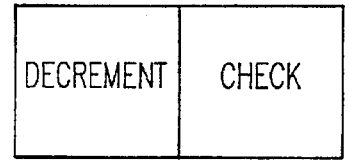
Figure 10:
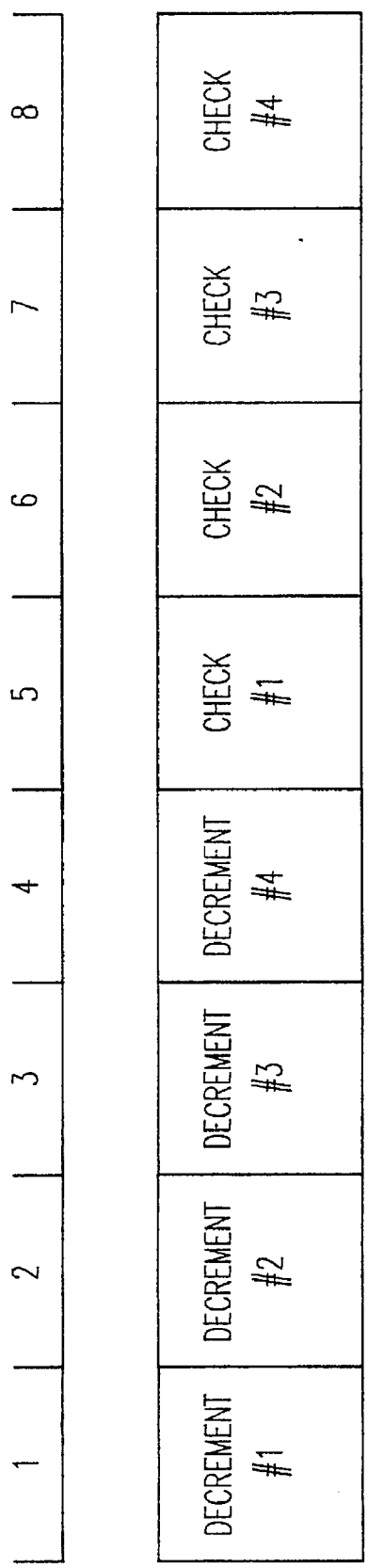
FIG. 10 is a time chart for explaining operations of the conventional multi-processor system.

Referring now to a time chart of FIG. 8, in accordance with the third embodiment of the present invention, one decrement and more than one checking are allowed in the same cycle. In other words, the access operation for checking process is performed for the communication register module #1 after the second cycle, in which the decrement has been completed at the first cycle. Thereafter, when the decrements are carried out in all of the communication register modules, the synchronization of all the processors is completed. As a consequence, the checking operations are carried out at the same time in all of the communication register modules at the fifth cycle, so that a confirmation can be made that the synchronization for all of the processors could be completed.

In the multi-processor system with the above-described arrangements according to this third preferred embodiment, the communication register access is processed as follows: In the case of the read access request, the read access operation is carried out for such a communication register module having the same module number as that of the processor which has issued the read access. At this time, each of communication registers is accessed unrelated to whether the real set or the copy set.

In the case of the write access request, after the write data is broadcasted by the communication register network 340, the write data is written into the respective communication register modules 320 in the same addresses.

In the case of the test-and-set command, the test process is performed for such a communication register module that there is the real communication register corresponding to the address of the communication register which performs the test process. As a result of the test process, if it fails to lock, then the test result is returned to the processor. Conversely, if it succeeds to lock, then the writing operation of the lock bit is carried out for the real communication register. Also, the writing process of the lock bit is performed via the communication register network 340 with respect to all of the communication register copies in the same addresses.

As previously described, in accordance with the third embodiment of the present invention, the communication register module 320 dedicated to each of the processors is employed. When the writing operation is requested, the writing request is broadcasted via the communication register network 340, so that the checking operation can be performed by the respective processors 100 at the same time, and the time required to carry out this checking operation can be shortened.

As previously described in detail, in the multi-processor system according to the present invention, it is possible to reduce buffering among the processors when the communication registers are employed. As a consequence, the synchronization control, the mutual exclusion control, or the communication control executed through the communication registers can be performed fast.

What is claimed is:

1. A multi-processor system comprising N processors ("N" being an integer), a storage unit, a communication register unit, and an interconnection network for interconnecting said processors, said storage unit, and said communication register unit, wherein said communication register unit includes N communication register modules each for storing data having the same number of words, each of said communication register modules is so controlled as to store the respective words having the same contents with each other, and also is dedicated to only one specific processor, said communication register modules for synchronizing communications among said processors, wherein, when a request issued from said processor corresponds to a test-and-set request, a test operation is carried out for such a communication register module containing a set where module numbers sequentially attached to said communication register modules from a first module number are coincident with set numbers sequentially attached to said sets from a first set number, and when a result of said test operation becomes "lock fail", said test operation result is returned to said processor, whereas when said result of said test operation becomes "lock success", a write access of lock is performed in the same address of all of said communication register modules.

2. The multi-processor system as claimed in claim 1, wherein said interconnection network broadcasts a write request issued from said processor to all of said N communication register modules.

3. The multi-processor system as claimed in claim 1, wherein said communication register unit further includes a network interface circuit, and said network interface circuit broadcasts a write request issued from said processor to all of said N communication register modules.

4. The multi-processor system as claimed in claim 1, wherein said communication register unit further includes a communication register network, and when a write request is issued from said processor to a certain communication register module, said communication register network broadcasts said write request to all other communication register modules of said N communication register modules.

5. The multi-processor system as claimed in claim 4, wherein said communication register module includes a plurality of ports which can be accessed at the same time, and allows such simultaneous accesses containing the read access from said processor and the write access through said communication register network.

6. The multi-processor system according to claim 1, wherein, when data is written into a communication register module of said N communication register modules, data having a same content as that of said data written into said communication register module, is written in a single cycle into a corresponding word within other communication register modules.

7. The multi-processor system according to claim 1, wherein, when a predetermined operation is requested in said multi-processor system, a request for the predetermined operation is broadcast to all of said processors via said interconnection network such that a checking operation is performed by respective processors simultaneously in a single cycle.

8. The multi-processor system according to claim 7, wherein said predetermined operation comprises a write operation.

9. The multi-processor system according to claim 7, wherein a phase of said checking operation of the multi-processor system is completed within a number of steps determined in proportion to a respective processor of said N processors of said multi-processor system.

10. A multi-processor system comprising N processors ("N" being an integer), a storage unit, a communication register unit, and an interconnection network for interconnecting said processors, said storage unit, and said communication register unit, wherein said communication register unit includes N communication register modules each for storing data having the same number of words, each of said communication register modules is so controlled as to store the respective words having the same contents with each other, and also is dedicated to only one specific processor, wherein each of said communication register modules is subdivided into N sets constructed of M words ("M" being an integer), and when a request issued from said processor corresponds to a read request, a read access is produced in the communication register module dedicated to said processor wherein, when the request issued from said processor corresponds to a write request, said write request is broadcasted to all of said communication register modules and then the write accesses are produced in all of said communication register modules, and wherein, when the request issued from said processor corresponds to a test-and-set request, a test operation is carried out for such a communication register module containing a set where module numbers sequentially attached to said communication register modules from a first module number are coincident with set numbers sequentially attached to said sets from a first set number, and when a result of said test operation becomes "lock fail", said test operation result is returned to said processor, whereas when said result of said test operation becomes "lock success", a write access of lock is performed in the same address of all of said communication register modules.

* * * * *